Feb. 4, 1930.   R. J. MINSHALL   1,746,008
COMBINATION BRAKE AND RUDDER PEDAL FOR AIRCRAFT
Filed Aug. 30, 1928   2 Sheets-Sheet 1
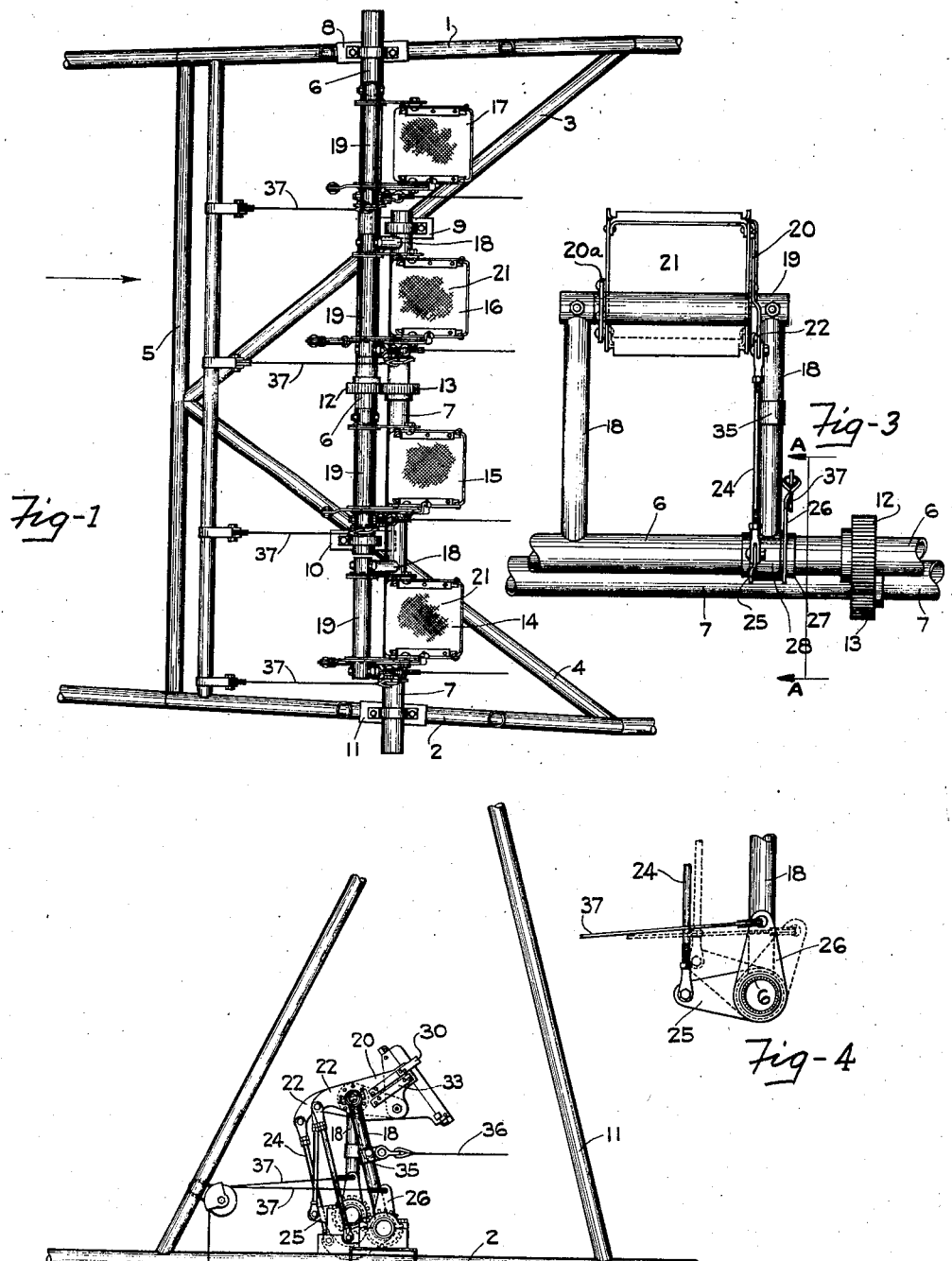
INVENTOR
Robert J. Minshall INVENTOR
Robert J. Minshall.

Patented Feb. 4, 1930

1,746,008

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON

COMBINATION BRAKE AND RUDDER PEDAL FOR AIRCRAFT

Application filed August 30, 1928. Serial No. 302,912.

This invention relates to improvements in controls for aircraft and more especially brake and rudder controls, wherein a pair of adjacent parallel shafts are geared together to rotate in opposite directions and are provided with a new and novel form of combination brake and rudder pedal. Two sets of these pedals are arranged side by side, on the shafts for operation by either of two pilots, whereby for example, in a training plane, the experienced pilot can correct the action of a student pilot, and on the large passenger carrying ships the pilots sitting side by side can alternate at the controls without changing seats. Furthermore the pedals are so constructed that the rudders may be operated by application of pressure to the pedals in one direction, while pressure in another direction will operate the brake controls. Thus two pilots may shift to and from the controls without disturbance of the controls, thereby eliminating the dangers now experienced in ships provided with single controls.

These and other objects will appear as my invention is more fully hereinafter described in the following specification, illustrated in the accompanying drawings, and finally pointed out in the appended claims.

In the drawings:

Figure 1, is a plan view of a fragment of an airplane structure forming the pilots' compartment, showing my improved form of combination brake and rudder pedal secured to a pair of geared shafts rotatably and transversely disposed within said cockpit.

Figure 2, is a side elevation of Figure 1.

Figure 3, is an enlarged view of a pedal, looking in the direction of the arrow in Figure 1.

Figure 4, is a fragmentary detail view taken on the line "A"—"A" of Figure 3.

Figure 5:
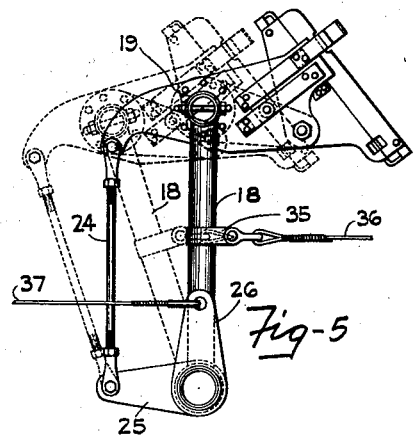
Figure 5, is a side elevation of the pedal showing in dotted lines its position for operating the rudder.
Figure 6:
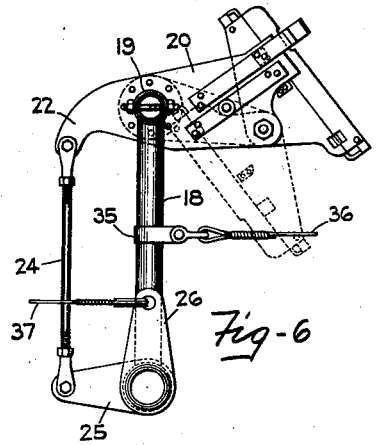
Figure 6, is a side elevation of the pedal showing in dotted lines the pedal plate in one of its adjusted positions.

Referring now more particularly to the drawings:

Reference numerals 1 and 2 indicate the usual lower longérons of an airplane at that portion of the structure which forms the pilots' compartment. 3 and 4 are diagonal bracing members secured to a cross bracing member 5 and the longérons 1 and 2. A pair of parallel shafts 6 and 7 are rotatably mounted in bearings 8, 9, 10 and 11 which are secured to the longérons and bracing members as shown. The shafts are interconnected for simultaneous, opposite and equal movement by a pair of gear wheels 12 and 13. To the shafts are mounted two sets of upstanding pedals 14, 15, 16 and 17, and as they are all identical with each other, a description of one will suffice for all. The two pedals 15 and 17, it will be noted are on one shaft, and the other two pedals 14 and 16 are on the other shaft, whereby each set of pedals controls both shafts, or any one pedal will actuate both shafts. The pedals are formed with upstanding tubular members 18 which are secured at their upper ends to a cross member 19, thus forming a bail member. Swingably mounted on the cross member 19 are a pair of plates 20 and 20ª which are interconnected by a pedal plate 21 which is pivotally mounted to the plates 20 and 20ª by means of bolts 20ᵇ. The plate 20 is extended and reduced to a lug portion 22, apertured as at 23 and adapted to connect with an adjustable link 24. The lower end of the link 24 connects with a bell crank formed with two arms 25 and 26 disposed at right angles with respect to each other and spaced apart by a bushing 27 to which both arms are secured and which bushing is rotatably mounted on the shaft 6. The lower end of the upright member 18 is formed with a collar 28 which rotatably embraces the bushing 27.

Figure 7:
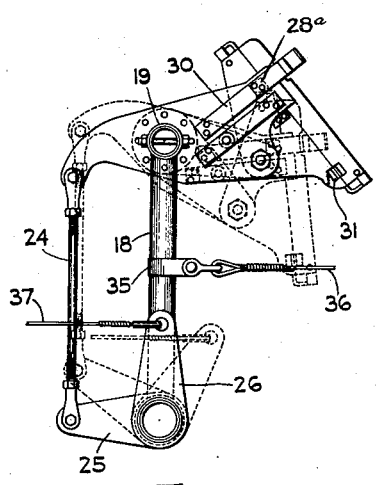
Figure 7, is a side elevation of the pedal showing in dotted lines the position of the pedal plate and its related parts for operating the brake controls.
Figure 8:
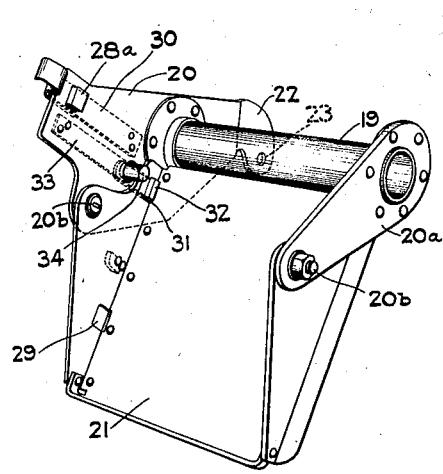
Figure 8, is a perspective view of the pedal plate and its pivotal connections.

The pedal plate 21, as previously stated is pivotally mounted to the plates 20 and 20ª for convenience in adjusting it to the leg of the operator. In the upper position as shown in full lines in Figure 7, the pedal plate is held by a lug 28ª engaging with an aperture 29 in the side wall of the pedal plate. The lug 28ª is mounted to a spring plate 30, one end of which is riveted to the plate 20. The free end of the spring plate extends beyond the plate 20 and is curved inwardly and upwardly within convenient reach of the operator's foot. When it is desired to lower the pedal plate into the position shown in Figure 8, outward pressure is applied to the free end of the spring plate 30, and the lug 28ª is withdrawn from the aperture 29. The pedal plate thus released swings downwardly by gravity until another aperture 31 engages with a lug 32 mounted to another spring 33 which is also riveted to the plate 20. The spring plate 33 is formed with a projection 34, which when pressed outwardly by the foot of the operator will disengage the lug 32 from the aperture 31 and the pedal plate is again free to swing about its pivot points.

On the upright member 18 a collar 35 is formed into a lug to connect with a rudder control cable 36 and as the pedal assembly is rocked about its pivot point the rudder cable will of course be moved forwardly or rearwardly with a resultant right or left swing of the rudder. A cable 37 extends outwardly from the arm 26 of the bell crank over suitable pulleys or the like to the usual brake controls, and due to the bushing 27 and the collar 28 the pedal is free to function for rudder operation without disturbing the brake control cables, and when it is desired to operate the brake control cables, regardless of the position or movement of the pedal for rudder operation, downward pressure can be applied to the pedal plate until the parts assume the positions shown in dotted lines in Figure 7, where it will be seen that the upright member 18 and its rudder control cable is undisturbed, but the arm 26 of the bell crank is moved rearwardly with a resultant pull on the brake control cable 37.

While I have shown a particular form of embodiment of my invention I am aware that many minor changes therein will readily suggest themselves to others skilled in the art without departing from the spirit and scope of the invention.

Having thus described the invention, what I claim as new and desire to protect by Letters Patent is:—

1. In a device of the class described, the combination of a pair of parallel shafts rotatably mounted within the fuselage of an airplane, a plurality of actuating members of parallelogram formation for each of said shafts, means for imparting rotary motion to both of said shafts upon moving any one of the actuating members, said actuating members being connected with the rudder surface of the airplane and the wheel brakes for the airplane, means actuated by the movement of said actuating members of parallel formation for selectively or simultaneously operating the said rudder or said wheel brakes.

2. In a device of the class described, the combination of a pair of parallel shafts geared together for rotation in opposite and equal directions, a pair of foot pedal structures on each of said shafts, said pedal structures being of parallelogram formation having one side thereof connecting with a rudder actuating means and the opposite side thereof connecting with wheel brake actuating means, said parallelogram formation permitting of selective or simultaneous operation of the rudder actuating means and the wheel brake actuating means.

In testimony whereof I affix my signature.

ROBERT J. MINSHALL.